Jan. 21, 1941. O. J. HOLMES 2,229,454
PICTURE APERTURE GATE
Filed May 28, 1937 3 Sheets-Sheet 1

Inventor
Oscar J. Holmes
By:- Cox & Moore
attys

Jan. 21, 1941. O. J. HOLMES 2,229,454
PICTURE APERTURE GATE
Filed May 28, 1937 3 Sheets-Sheet 2
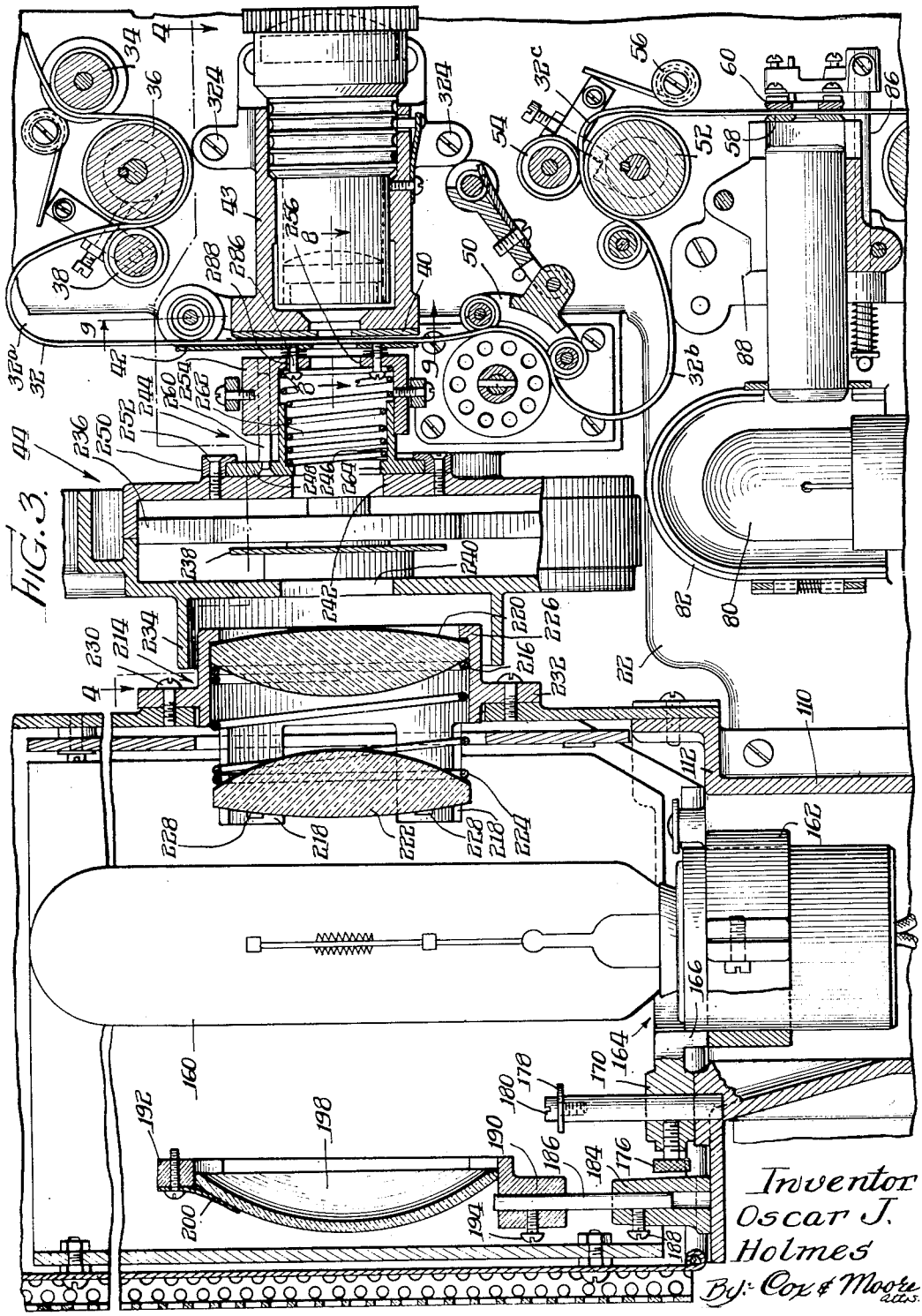
Inventor
Oscar J. Holmes
By: Cox & Moore
attys.

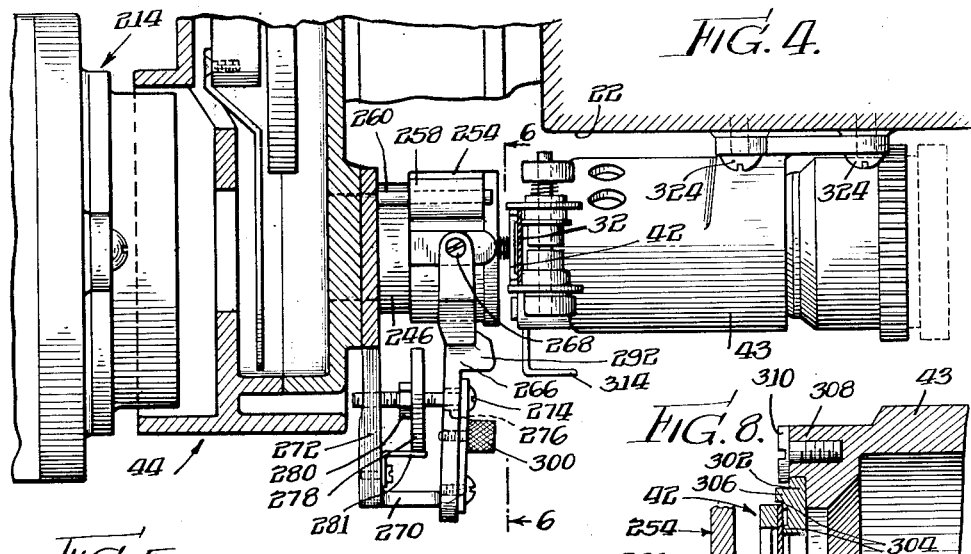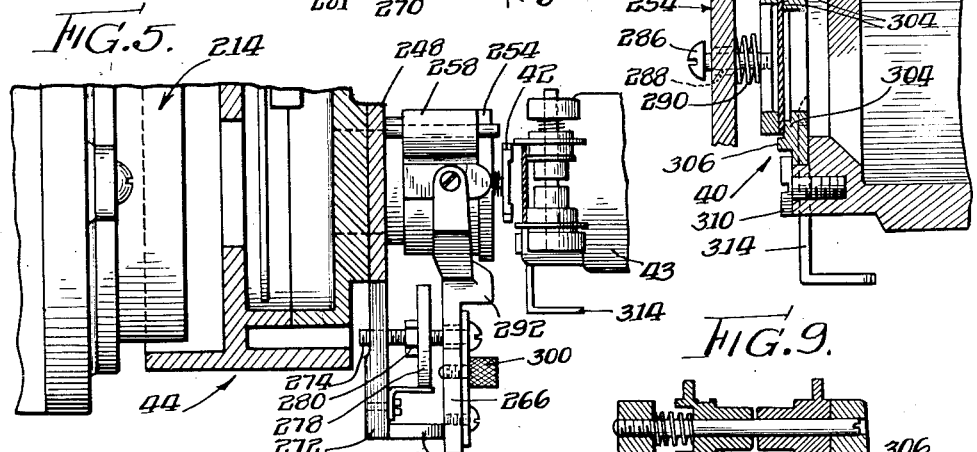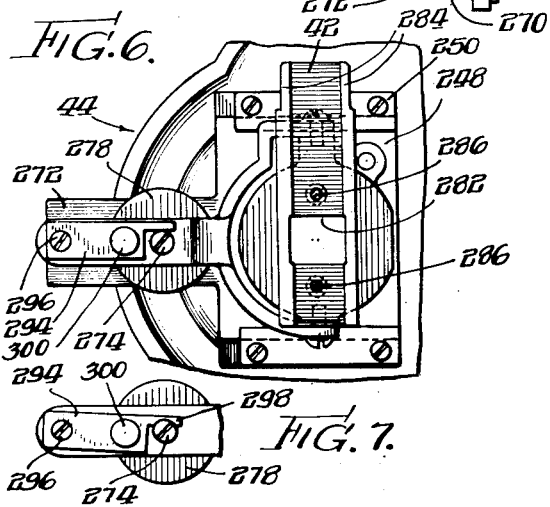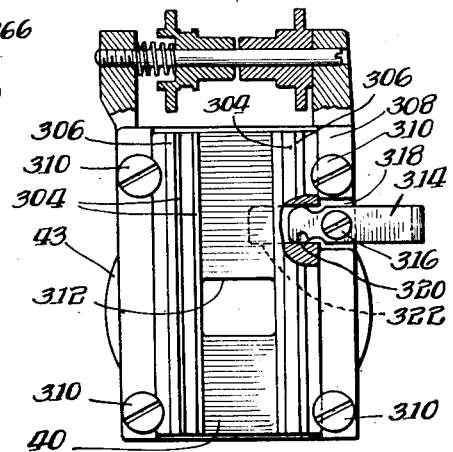

Patented Jan. 21, 1941

2,229,454

UNITED STATES PATENT OFFICE 2,229,454

PICTURE APERTURE GATE

Oscar J. Holmes, Chicago, Ill.

Application May 28, 1937, Serial No. 145,315

6 Claims. (Cl. 88—17)

This invention relates to motion picture apparatus and more particularly to the construction and mounting of the film engaging picture gates. More specifically the invention relates to a projector or camera for handling 16-m. m. picture film.

An important object of the invention is to provide improved mounting means for the picture gates of motion picture apparatus whereby said gates automatically are maintained in proper engagement and alinement with the film and the tension exerted by said gates is adjustable in a simple and facile manner during operation of the film.

A more specific object of the invention is to provide adjustable screw means for determining the tensioning of the film.

A further object of the invention is the provision of means for so mounting a film engaging gate upon the fixed support of the film apparatus, that said gate and its mounting may be readily removed as a unit for cleaning and repair.

A further important object of the invention is to provide in a motion picture apparatus having a pair of picture gates, means for opening the picture gates to permit threading of the film therebetween and to provide automatically operable means for locking the gates in open position during threading of the film, said locking means being provided with readily operable releasing means to allow the gates to close after the threading operation has been completed.

Numerous other objects and advantages will be apparent from the following description when taken in connection with the drawings, wherein:

Fig. 3 is an enlarged fragmentary, longitudinal, vertical section through the machine shown in Fig. 1.

Fig. 4 is a fragmentary horizontal section taken along the line 4—4 of Fig. 3.

Fig. 5 is a fragmentary horizontal section similar to Fig. 4 but with certain of the mechanisms in a different position of operation.

Fig. 6 is a fragmentary vertical section taken along the line 6—6 of Fig. 4.

Fig. 7 is a detail view of the picture gate locking lever.

Fig. 8 is a fragmentary horizontal section taken along the line 8—8 of Fig. 3.

Fig. 9 is a fragmentary vertical section taken along the line 9—9 of Fig. 3.

Figure 1:
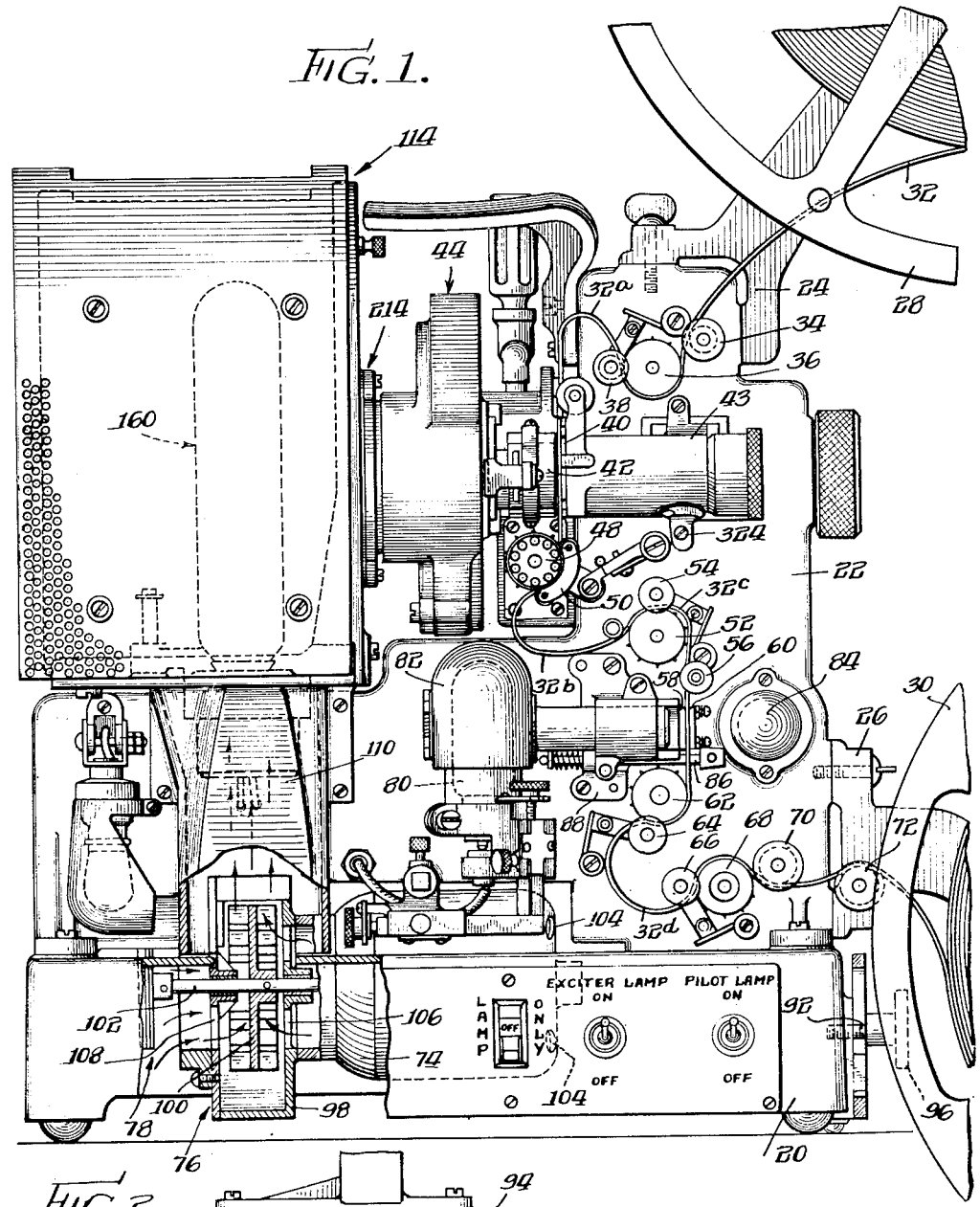
Fig. 1 is a side elevational view of a sound-on-film motion picture projector embodying the invention.
Figure 2:
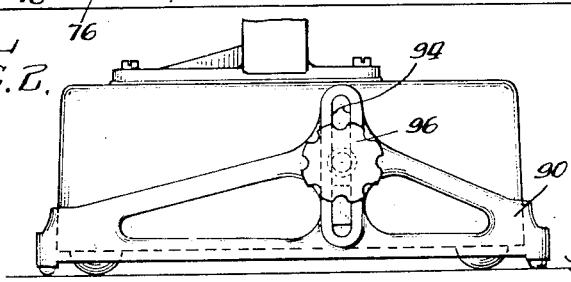
Fig. 2 is a fragmentary view of the front end of the projector showing the adjustable supporting stand.

Referring now the drawings more in detail, wherein like numerals have been employed to designate like parts throughout the various figures, it will be seen that I have disclosed for illustrative purposes a motion picture sound-on-film projector having a suitable base 20 upon which is mounted a body casting 22 supporting a pair of reel brackets 24 and 26. A supply reel 28 is mounted upon the bracket 24 and the take-up reel 30 is mounted upon the bracket 26, the brackets 24 and 26 being readily detachable from the body casting 22 for the purpose of facilitating transportation of the projector.

From the supply reel 28, the film 32 passes over a guide roller 34 to and around a feed sprocket 36 in engagement with which the film is held by a releasable tension roller 38. The film 32 is threaded from the roller 38 through a pair of picture aperture gates 40 and 42, a suitable loop 32a being provided between the roller 38 and these aperture gates. The aperture gate 40 is mounted in a manner later to be described upon the projection lens housing 43, and the aperture gate 42 is adjustably mounted (in a manner also later to be described) upon the front of a casting 44 in which are mounted suitable light controlling shutters constructed and arranged as described in my copending application Serial No. 145,316 filed on May 28, 1937. From the picture gates the film 32 passes to an intermittently driven picture sprocket 48 with which the film is held in contact by a spring pressed releasable shoe 50 and from the sprocket 48 to a take-up drive sprocket 52, a suitable loop 32b being provided between the sprockets 48 and 52 to permit the film to be driven at a constant speed by the sprocket 52 while the sprocket 48 moves the film only intermittently. A releasable spring pressed roller 54 maintains the film in engagement with the sprocket 52. The film 32 is threaded from the sprocket 52 over a guide roller 56, through fixed and movable light aperture sound gates 58 and 60, respectively, to a sound sprocket 62, a one sprocket hole loop 32c being provided between the sound gate and the sprocket 52. A releasable spring pressed roller 64 maintains the film in engagement with the sound sprocket 62, from which the film passes to a roller 66, a take-up sprocket 68 and thence over idler rollers 70 and 72 to the take-up reel 30, a loop 32d being provided between the sprockets 62 and 68.

A motor 74, mounted in and upon the base 20, through suitable mechanism such as described in my copending application above referred to, and in my copending applications Serial No. 127,709 filed February 25, 1937, now Patent No. 2,117,806, and Serial No. 145,314, filed May 28, 1937, drives the sprockets 36, 48, 52, 62, 68 and the take-up reel 30 and the picture shutters in the housing 44 and also drives an air pump or blower 76 and a centrifugally operated speed governor 78.

In passing through the sound gates 58 and 60 the film is interposed between an exciter lamp 80 mounted in a housing 82 and a photoelectric cell (not shown) mounted in a housing 84, the housings 82 and 84 being mounted upon the body casting 22. The sound gates 58 and 60 may be constructed and mounted as disclosed in my copending application Serial No. 145,314. It suffices to observe here that the gate 60 is mounted upon a rod 86 slidable in a bracket 88 secured to the body casting 22 to permit the gate 60 to move away from the gate 58 and the film 32 to be threaded therebetween. The exciter lamp 80 may be mounted in any convenient manner but preferably in the manner shown in my application last above noted.

An auxiliary supporting standard 90 is secured to the front end of the supporting base 20 by means of a screw 92 passing through an elongated slot 94 in the standard 90 and engaging in a suitable threaded aperture in the base 20. The screw 92 is preferably provided with an enlarged head 96 clamping the standard on the base. By adjustment of the screw 92 lengthwise of the slot 94, the projector may be vertically tilted to precisely position the projecting system relative to the screen upon which the pictures are to be projected.

The casing 98 of the blower 76 is preferably secured to the casing of the motor 74, and the propeller or fan 100 of the blower and the governor 78 are secured to the extending end of the motor shaft 102. Openings 104 are provided in the remote end of the motor casing and openings 106 and 108 are provided in the opposite sides of the blower casing 98 to permit cooling air to be drawn through the motor casing and axially of the blower to the propeller 100 by which the air is expelled through a suitable opening in the casing into a vertical air duct or channel 110 secured to one face of the body casting 22. The channel 110 is formed at its upper end with laterally extending flanges forming a base 112 for a housing 114.

The socket for the projector lamp 160 is adapted to be clampingly received in a split collar portion 162 of a lamp bracket 164 having a pair of vertically extending arms or portions 166 integral with the split collar and a plurality of horizontally extending arms or portions connected at their remote ends by an integrally formed arm. At their outer ends the arms are provided with bosses 170 vertically apertured to slidably receive posts 172 threaded into bosses formed in the upper surface of the base 112. One of the bosses is provided with a transverse threaded opening in which is received a set screw 176 engageable with a post 172 to lock the bracket 164 in adjusted position, and one of the posts is also provided at its upper end with an adjustment limiting washer 178 secured thereto by a set screw 180. The lamp socket extends into the air duct 110 with sufficient clearance to permit of free circulation of air upwardly through the duct and around the lamp 160.

As will be apparent, the lamp housing accommodates various sizes of projector lamps. It is essential that the center of the filament of the projection lamp be precisely alined with respect to the picture apertures. With a fixed type of mounting for the projector lamp, it is impossible to employ any but a single size and manufacture of lamp because the distance from the center of the filament to the base of the socket varies with different power lamps and with lamps of different manufacture. Applicant's adjustable mounting may be so dimensioned as to accommodate, within reasonable limits, any size or manufacture of projector lamp. However, it is preferred to so dimension this mounting that with the bracket 164 in its lowest position the centers of the filaments of a 1,000-watt lamp of common manufacture will be precisely positioned relative to the picture apertures and with the bracket in its topmost position the centers of the filaments of a 500-watt lamp of common manufacture will be precisely positioned relative to said picture apertures. Various sizes of lamps between the 500-watt lamp and the 1,000-watt lamp may be employed and the bracket 164 accordingly adjusted along the posts 172. However, for these two limiting sizes of lamps it is merely necessary to move the bracket to its full limit of adjustment in either direction.

A bracket having a vertical boss 184 is secured to the base 112 of the housing adjacent its rear edge and receives in suitable apertures a post 186 and a set screw 188 by which the post is adjustably mounted on the bracket. The post at its upper end is slidably received in a suitable opening in the boss portion 190 of a reflector frame 192 and a set screw 194 secures the frame in adjusted position on said post. The reflector frame 192 has formed on its rear face a pair of annular flanges forming a seat for receiving a concave reflector 198 detachably secured in said seat by a plurality of (preferably three) angularly disposed resilient strips 200 adapted to overlie the rear face of the reflector and secured to the frame in any suitable manner as by screws 202. The reflector frame 192 is made adjustable so that it may be maintained at all times in proper alinement with the center of the filament of the projector lamp and the picture apertures. In case of breakage of the reflector, the same may be quickly replaced upon manipulation of the holding strips 200, which also by reason of their resiliency permit expansion of the reflector caused by the heat of the projector lamp and notwithstanding such expansion maintain the reflector in proper alinement with the lamp and picture apertures.

In openings in the front walls of the lamp housing there is mounted a tube 214 (Fig. 3) having a cylindrical portion 216 and a plurality of angularly spaced, axially extending, arcuate fingers 218 receiving the usual light projector lenses 220 and 222. A spring 224 mounted in the tube 214 maintains the lenses 220 and 222 in spaced apart relation while permitting expansion thereof under the heating action of the projector lamp. Movement of the lens 220 out of the tube 214 is prevented by an annular end flange 226 and movement of the lens 222 outwardly of the arms 218 is prevented by pins 228 having portions threaded into the arms 218 and screw heads by which the pins may be removed from said arms to permit the insertion or removal of the lenses and the spring 224. The tube 214 is secured to the front wall of the housing in any suitable manner as by screws 230 passing through an integrally formed annular flange 232 of the tube and threadedly received in the housing wall. The forward end of the tube 214 extends into a cylindrical casing 234 formed integrally with the shutter casing 44. In the shutter casing 44 are mounted a light controlling picture shutter 236 and a safety shutter 238 constructed and arranged as described in my copending application, Serial No. 145,316 hereinabove noted. The rear wall of the casing 44 is provided with an opening 240, and the forward wall of said casing is provided with an opening 242 by which openings the light is transmitted through the casing and controlled by the interposed shutters 236 and 238. On the front surface of the casting 44, there is secured an adjustable mounting 244 for the self-alining rear picture gate 42. This adjustable mounting means 244 (as best shown in Figs. 3 to 9) comprises a tube 246 formed integrally with a substantially rectangular plate 248 detachably clamped by transverse channel members 250 and screws 252 to the casting 44. Slidably mounted upon the tube 246 is a cap member 254 having a rectangular opening 256 in its forward end and having a radially extended lug or boss 258 apertured to receive a guide pin or rod 260 secured to and projecting forwardly from the plate 248. A spring 262 seated in the tube 246 engages at one end an internal annular flange 264 of the tube and at its other end bears against and normally urges the cap member 254 outwardly of the tube. A bifurcated lever or yoke 266 is pivotally secured by diametrically disposed screws or pins 268 to the cap member 254. The lever or yoke 266 extends radially from the cap member and its outer end rests upon a forwardly turned lug 270 carried by an arm 272 formed integrally with the plate 248. An adjusting screw 274 passes loosely through an enlarged opening 276 in the lever 266 and is threaded into the arm 272. A disk 278 for rotating the screw 274 and thereby adjusting the lever 266 relative to the arm 272 is secured to an intermediate portion of the screw by a clamping nut 280 welded or otherwise secured to the disk and having such a close fit with the threads of the screw that the disk, nut and screw are rotatable as a unit. A spring finger 281 frictionally engages the disk 278 and maintains the screw in adjusted position.

The picture gate 42, which comprises a plate having a picture aperture or opening 282 and a plurality of film engaging, friction reducing, guide ribs 284, is mounted upon the cap member 254 by a pair of pins 286 loosely received in enlarged openings 288 in the front of the cap member. A pair of light coiled springs 290 surrounds the pins 286 and are interposed between the gate 42 and the cap member 254 and resiliently urge the gate into film engaging position. Movement of the gate outwardly of the cap member and the action of the springs 290 is limited by the enlarged heads of the pins 286 as best shown in Fig. 3. The spring 262, which urges the cap member 254 outwardly of the tube 246, forces the gate 42 into engagement with the film and thereby tensions the film between that gate and the forward gate 40. The degree of tension exerted by the spring 262 is adjustably controlled by the screw 274, the head of which, in engaging the lever 266, determines the limit of movement of the cap member 254 in a direction toward the film. By rotating the disk 278 and the screw 274 so that the lever 266 is moved rearwardly toward the arm 272, the film tension exerted by the spring 262 is reduced and by rotating said disk and screw in the opposite direction the film tension is increased. It should be noted that adjustment of the tension or pressure exerted by the spring 262 on the film can be made while the film is in operation and thereby previous hit and miss methods of adjusting the film tension are eliminated.

The "full floating" characteristic of the picture gate 42, obtained by resiliently mounting the gate on the cap member 254 and by resiliently mounting the cap member on the member 244, is of particular importance. This floating characteristic insures that the gate 42 will constantly engage the film and apply a uniform pressure thereto. The emulsion on a motion picture film does not wear equally and it is often found that such film varies in thickness from side to side of the film and this variation in thickness, in prior art machines, causes the film to become misalined relative to the light transmitting apertures in the picture gates and also causes the motion of the film to become somewhat "jerky." The flexibility of applicant's mounting means for the picture gate 42 permits this gate to compensate for the variation in depth of the emulsion, caused by wear or otherwise, and thereby causes the film to move evenly and without jerk between the picture gates. This compensation for the variation in thickness of the film is accomplished by reason of the fact that the picture gate is free to tilt in any direction and automatically alines itself with the face of the film.

In order that the film may be threaded between the gates 40 and 42 the cap member 254 may be moved rearwardly by force applied to a lug 292 formed on the lever 266 and the gates are held in open position by a locking lever 294. The locking lever 294 is loosely pivoted by a pin or screw 296 to the lever 266 and is provided with a finger 298 which, when the lever 266 is moved rearwardly to open the gates, drops between the enlarged head of the screw 274 and the face of the lever and thereby maintains the lever in its rearward position with the gate open. A thumb screw 300 having an enlarged, preferably knurled, head is threaded into the locking lever 294 and is movable in an enlarged opening in the lever 266. When the threading of the film through the projector has been completed the thumb screw 300 is operated to move the locking lever 294 out of engagement with the head of the screw 274, and the spring 262 then automatically closes the gates.

The forward picture gate 40 comprises a plate 302 having film engaging, friction reducing, ribs 304 and film guiding ribs or projections 306. The plate 302 is mounted between suitable shoulders on a plate 308 formed integrally with the lens housing 43 and is held against outward movement by the overlapping heads of a plurality of cap screws 310 threaded into the plate 308. The plate 302 is provided with the usual picture aperture 312 and is movable in a vertical direction relative to the plate 308, properly to aline the picture aperture 312 with the picture aperture 282 in the gate 40, by a lever 314 secured by a friction pivot 316 in a slot 318 in the face of the plate 308. The lever 314 is provided with a cam-like end portion 320 engaging the opposite edges of a slot 322 cut into the rear face of the plate 302. It will be evident that by moving the lever 314 on its friction pivot 316, the plate 302 may be adjusted vertically upwardly or downwardly.

The picture gates 40 and 42 and their mounting means are readily removable for cleaning. The gate 40 and its mounting may be removed by removing screws 324 by which the lens housing 43 is mounted upon the body casting 22. The gate 42 and its mounting may be removed for cleaning by loosening the screws 252 and sliding the plate 248 laterally out of its mounting channels 250.

It will be seen from the above description that applicant has provided motion picture apparatus or the like wherein improved mounting means for the picture gates is provided whereby said gates automatically are maintained in proper engagement and alinment with the film and the tension exerted by said gates is easily adjustable during operation of the film.

Changes may be made in the form, construction and arrangement of the parts without departing from the spirit of the invention or sacrificing any of its attendant advantages, and the right is hereby reserved to make all such changes as fairly fall within the scope of the following claims.

The invention is hereby claimed as follows:

1. In motion picture apparatus of the film type, a support, a light directing member having a tubular portion and a laterally extending base portion, a cylinder open at one end and closed at the other end, said closed end having an aperture concentric with the axis of said tubular portion, said cylinder being slidably mounted on the tubular portion of the light directing member, a film engaging gate having an aperture concentric to the axis of said tubular portion, yieldable means for mounting said gate on the closed end portion of said cylinder whereby said gate automatically aligns itself relative to said film, resilient means interposed between the base portion of said light directing member and the closed end portion of the said cylinder for normally urging said cylinder and said gate in a direction toward said film to cause said film to exert a pressure upon said gate, and means for adjusting said cylinder along the tubular portion of said light directing member for controlling the degree of pressure exerted upon said film, said adjusting means comprising a lever pivotally secured to said cylinder and extending laterally therefrom, and an adjustment screw threaded into the laterally extending base portion of said light directing member and having a loose pivotal connection to said lever.

2. In motion picture apparatus of the film type, a support, a light directing member having a tubular portion and a laterally extending base portion, a cylinder open at one end and closed at the other end, said closed end having an aperture concentric with the axis of said tubular portion, said cylinder being slidably mounted on said tubular portion, a film engaging gate having an aperture concentric to the axis of said tubular portion, yieldable means for mounting said gate on the closed end portion of said cylinder whereby said gate automatically alines itself relative to said film, resilient means interposed between the base portion of said light directing member and the closed end portion of the said cylinder for normally urging said cylinder and said gate in a direction toward said film to cause said gate to exert a pressure upon said film, and adjustable means for limiting the movement of said cylinder thereby to control the pressure exerted upon said film.

3. In motion picture apparatus of the film type, a pair of picture aperture gates adapted to engage opposite sides of the film, means for mounting one of said gates for adjustment longitudinally of said film, a support, and means for detachably and adjustably mounting said other gate on said support, said last mentioned means comprising a light directing member having a tubular portion concentrically disposed relative to the apertures in said picture gates and a laterally extending base portion, means for detachably connecting said base portion to said support, a gate supporting cylinder slidably mounted on the tubular portion of said light directing member, said supporting member having an apertured portion partially closing one end, resilient means for yieldably mounting said other gate on said supporting cylinder, spring means mounted in the tubular portion of said light directing member and bearing at one end against the end portion of said cylinder, said spring normally urging said cylinder in a direction toward said film to cause the gate carried thereby to frictionally engage said film and exert a pressure thereupon, a lever pivotally secured to said cylinder and extending radially therefrom, and means adjustably connecting said lever to the base portion of the light directing member whereby the tension of the film may be adjusted during movement of the film.

4. In a motion picture apparatus of the film type, a support, a light-directing member mounted on said support and having a tubular portion, a cylinder open at one end and closed at the other, said cylinder being slidably mounted on the tubular portion of the light-directing member, the closed end of the cylinder having an aperture therein for transmitting the light directed through the tubular portion of the light-directing member, a film-engaging gate having an aperture therein aligned with the aperture-enclosed end of the cylinder, yieldable means for mounting said gate on the closed end portion of said cylinder whereby said gate automatically aligns itself relative to said film, resilient means interposed between the light-directing member and the cylinder for normally urging said cylinder and said gate in the direction toward said film to cause said gate to exert pressure upon said film, and means for adjusting said cylinder along the tubular portion of said light-directing member for controlling the degree of pressure exerted upon said film, said adjusting means comprising a lever pivotally secured to said cylinder and extending laterally therefrom, an adjustment screw threaded into a member fixed relative to the light-directing member and passing through an enlarged opening in said lever, the head of the screw limiting the movement of the lever, and means for locking the cylinder in a rearward position on the tubular portion of the light-directing member and against the action of said resilient means, said locking means comprising a latch carried by said lever and having a portion adapted to engage behind the head of the screw thereby to hold the cylinder in such rearward position.

5. In a motion picture apparatus of the film type, a support, a light-directing member mounted on said support and having a tubular portion, a cylinder open at one end and closed at the other, said cylinder being slidably mounted on the tubular portion of the light-directing member, the closed end of the cylinder having an aperture therein for transmitting the light directed through the tubular portion of the light-directing member, a film-engaging gate having an aperture therein aligned with the aperture-enclosed end of the cylinder, yieldable means for mounting said gate on the closed end portion of said cylinder whereby said gate automatically aligns itself relative to said film, resilient means interposed between the light-directing member and the cylinder for normally urging said cylinder and said gate in the direction toward said film to cause said gate to exert pressure upon said film, a second picture gate engageable with the opposite side of the film from that engaged by the first gate, said second gate having an aperture therein, a support for said second gate, and means for adjustably mounting said second gate on said support for adjustment longitudinally of the film to align the aperture in said second gate with the aperture in the first gate.

6. In a motion picture apparatus of the film type, a support, a light-directing member mounted on said support and having a tubular portion, a cylinder open at one end and closed at the other, said cylinder being slidably mounted on the tubular portion of the light-directing member, the closed end of the cylinder having an aperture therein for transmitting the light directed through the tubular portion of the light-directing member, a film-engaging gate having an aperture therein aligned with the aperture-enclosed end of the cylinder, yieldable means for mounting said gate on the closed end portion of said cylinder whereby said gate automatically aligns itself relative to said film, resilient means interposed between the light-directing member and the cylinder for normally urging said cylinder and said gate in the direction toward said film to cause said gate to exert pressure upon said film, a second picture gate engageable with the opposite side of the film from that engaged by the first gate, said second gate having an aperture therein, a support for said second gate, and means for adjustably mounting said second gate on said support for adjustment longitudinally of the film to align the aperture in said second gate with the aperture in the first gate, an adjusting means for said second gate comprising a lever carried by the support for said second gate and having a portion received in an opening in the second gate.

OSCAR J. HOLMES.